March 24, 1942.    A. A. LEAVITT    2,277,118
EYEGLASS FRAME
Filed June 4, 1941
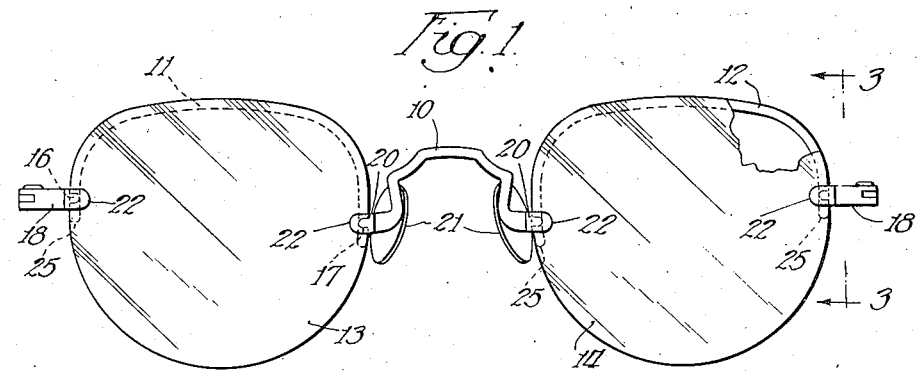
Fig. 1
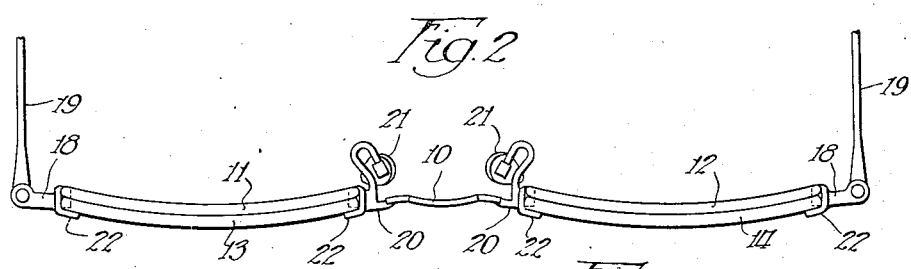
Fig. 2
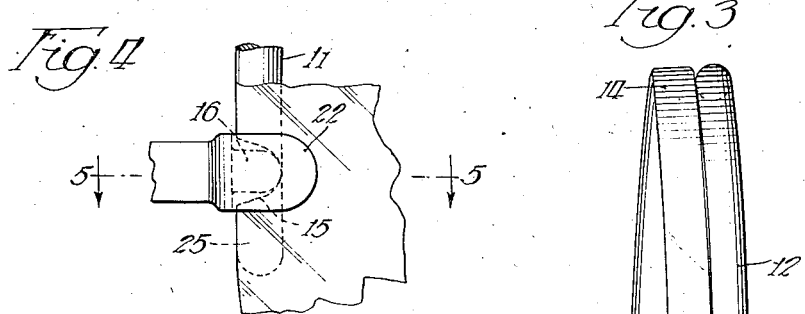
Fig. 3
Fig. 4
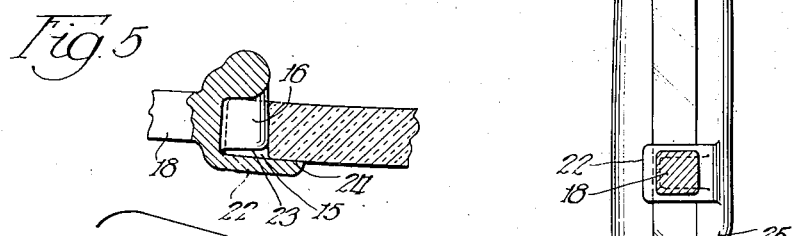
Fig. 5
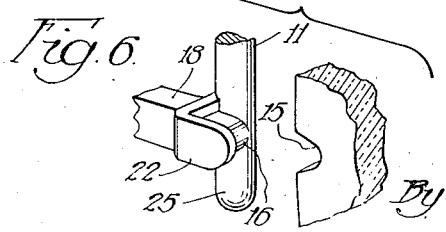
Fig. 6
Inventor
Abe A. Leavitt
By Zabel Carlson Britbaugh & Wells
Attys.

Patented Mar. 24, 1942

2,277,118

UNITED STATES PATENT OFFICE 2,277,118

EYEGLASS FRAME

Abe A. Leavitt, Chicago, Ill., assignor of one-half to Bert H. Quint

Application June 4, 1941, Serial No. 396,556

2 Claims. (Cl. 88—47)

The present invention relates to eyeglass frames. The principal purpose of the invention is to provide an eyeglass frame which will detachably hold the lens and which will not project beyond the peripheral edge of the lens except at the point of attachment of the bridge or the temple bows.

The present invention contemplates a device of this character wherein the lens is supported by a spring strip which lies along one side of the lens and has lugs thereon projecting toward the other side of the lens and including portions that seat in corresponding seats provided in the periphery of the lens itself. Means are provided whereby the lens may be clamped against the spring strip even though the lens thickness may vary.

The means just referred to comprises part of the frame structure that covers the seats in the periphery of the lens so that they are not visible from the front. The frame is shaped to follow the peripheral outline of the lens and remain within the outline between the seats. The frame also lies against the lens so as to protect and support the edge thereof without providing an exposed metal rim around the lens.

More specifically it is the purpose of the present invention to provide an eyeglass frame which detachably holds the lens and which does not project beyond the peripheral edge of the lens, the said frame being constructed to provide bridge and bow ears that have lens engaging lugs adapted to engage in recesses provided in the lens and caps not attached to the lugs but bendable to accommodate lenses of various thicknesses and to hold the lenses in contact with the spring strip.

This application is a continuation-in-part of my application Serial No. 258,371 filed February 25, 1939, for "Eyeglass frame."

The features and advantages of the present invention will appear more fully as the description proceeds, reference being had to the accompanying drawing wherein a preferred form of the invention is shown. It is to be understood however that the drawing and description are illustrative only and are not to be taken as limiting the invention except insofar as it is limited by the claims.

In the drawing:

Fig. 1 is a front view of a pair of eyeglasses embodying my invention;

Fig. 2 is a plan view of the eyeglasses shown in Fig. 1;

Fig. 3 is a sectional view taken substantially on the line 3—3 of Fig. 1;

Fig. 4 is an enlarged fragmentary front view of a portion of the lens and the frame;

Fig. 5 is a sectional view taken on the line 5—5 of Fig. 4; and

Fig. 6 is a fragmentary perspective view showing the lens separated from the adjacent bow ear.

Referring now to the drawing, the present invention is directed to an eyeglass frame which comprises a bridge portion 10 and two lens holding frames 11 and 12. The frames are adapted to detachably receive and hold two lenses 13 and 14. The lens holding frames 11 and 12 are similar in construction, each comprising a spring strip that is shaped to follow and lie within the periphery of the associated lens so as to be substantially unnoticeable from the front of the eyeglass. Each lens has two peripherally spaced notches such as those indicated at 15 in Figs. 4, 5 and 6 and each of the lens frames has two lugs 16 and 17 thereon adapted to engage in the notches of a lens inserted in the frame. The lugs 16 are remote from the bridge 10 and have suitable ears indicated at 18 for the attachment of temple bows 19. The lugs 17 are formed on bridge attaching ears 20 which may carry the usual nose pieces 21. It will be noted that the notches 15 are rounded and open and that the lugs 16 and 17 are also rounded so as to fit in the notches without binding.

Each of the lugs 16 and 17 extends forwardly and is rigid with the spring strip 11 or 12. Each of the ears upon which a lug is formed also carries a cap 22 which is separate from the adjacent end 23 of the corresponding lug (see Fig. 5). The cap 22 is shaped to cover the notch or seat 15 of a lens and extends inwardly beyond the notch over the front face of the lens as indicated at 24 (see Fig. 5). The caps 22 are substantial but are bendable so that they may be closed against an inserted lens so as to press the lens against the adjacent spring strip. It will be noted from the drawing that each spring strip extends downwardly beyond the lens-engaging lug as illustrated at 25 to further aid in holding the lens against rocking about the two opposite lugs as a pivot.

In eyeglass frames where ready detachability of the lens is desired, if the lens notch is such as to leave a relatively thin or sharp corner between the periphery of the lens and the notch there is an ever present danger that the lens will chip off. Thereafter the lens can no longer be held safely. The present invention obviates such a difficulty by making the notch 15 relatively broad and shallow so that the spring strips can be bent to remove the lenses from the frames without exerting any particular strain on the glass itself adjacent to the notch. The actual securing of the lens against movement in the frame is accomplished by the bendable cap 22 and the spring strip. The bendable cap serves to provide a point of support between the portion 25 of the spring strip and the main part thereof, which support is on the opposite side of the lens from the spring strip. Thus it is impossible for the lens to rock on the strip even though the lugs 16 fit in their seats rather loosely. This makes it unnecessary to have the pressure of the lugs in the notches any more than just sufficient to hold the lens against falling out.

Whenever it is desirable to dispense with the temple bows, the projecting ears 18 may of course be left off the lug 16.

The springy nature of the frames 11 and 12 makes it easy to release the lenses from the frames for replacement and for cleaning.

From the foregoing description it is believed that the construction and advantages of the present invention will be readily apparent to those skilled in this art. Having thus described my invention, what I claim as new and desire to secure by Letters Patent is:

1. In an eyeglass frame having spring strips adapted to bear against the rear surfaces of inserted lenses, a means for holding said lenses in position in the frame, said means comprising lugs extending forwardly from said spring strips and adapted to engage spaced notches in the lens periphery, said lugs extending forwardly from the frame strip a distance no greater than the smallest thickness of lens to be held, and caps extending forwardly from the frame strip and thence inwardly over the lug but separate from the front surface of the lug, said caps overlying the lugs and being substantially wider than the lugs whereby to cover a notch in the lens periphery in which a lug is seated, said caps being bendable toward the lugs to accommodate lenses of various thicknesses and to hold said lenses in contact with the spring strips, said spring strips extending beyond the lugs whereby the pressure of said caps against the lenses prevents rocking of the lenses about the lugs.

2. In an eyeglass frame having spring strips adapted to bear against the rear surfaces of inserted lenses, bridge and bow ears associated with said spring strips and fixed thereto intermediate the ends of the strips, said ears being adapted to abut the edges of said lenses, the abutting end of each ear having its rear portion joined to a spring strip and its front portion terminating in a bendable cap, said abutting end having a lens engaging lug disposed between the frame strip and the cap but attached to only one of them, and the cap being bendable toward the spring strip to clamp lenses of various thicknesses against the spring strip, whereby the lens is gripped edgewise by the lugs and the resiliency of such spring strip and is prevented from tipping with respect to the spring strip by the bendable cap.

ABE A. LEAVITT.